US010140229B2

(12) United States Patent
Zhang et al.

(10) Patent No.: US 10,140,229 B2
(45) Date of Patent: Nov. 27, 2018

(54) WIRED COMMUNICATION WITH REMOTE FUNCTION CALLS

(71) Applicant: Texas Instruments Incorporated, Dallas, TX (US)

(72) Inventors: Xiaoxi Zhang, Plano, TX (US); Nikolaus Klemmer, Dallas, TX (US); Hunsoo Choo, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 175 days.

(21) Appl. No.: 14/822,175

(22) Filed: Aug. 10, 2015

(65) Prior Publication Data

US 2016/0048470 A1 Feb. 18, 2016

Related U.S. Application Data

(60) Provisional application No. 62/035,222, filed on Aug. 8, 2014.

(51) Int. Cl.

| | |
|---|---|
| ***G06F 13/10*** | (2006.01) |
| ***G06F 9/445*** | (2018.01) |
| ***G06F 13/364*** | (2006.01) |
| ***G06F 13/42*** | (2006.01) |
| ***G06F 13/24*** | (2006.01) |

(52) U.S. Cl.

CPC ............ *G06F 13/364* (2013.01); *G06F 13/24* (2013.01); *G06F 13/4282* (2013.01)

(58) Field of Classification Search

CPC ... G06F 13/122; G06F 13/126; G06F 9/44578

See application file for complete search history.

(56) References Cited

U.S. PATENT DOCUMENTS 5,713,041 A * 1/1998 Chen ....................... G06F 13/24 710/1

6,757,776 B1 * 6/2004 Pew ....................... G06F 13/385 370/252

2006/0212546 A1 * 9/2006 Kishimoto ................ G06F 8/60 709/219

(Continued)

*Primary Examiner* — Ilwoo Park

(74) *Attorney, Agent, or Firm* — Andrew Viger; Charles A. Brill; Frank D. Cimino

(57) ABSTRACT

Triggered remote function calls can be used in master-slave systems to trigger slave-side software functions pre-loaded by a master into slave MCU memory, with associated parameters pre-loaded into a slave function interface memory. A master issues trigger-function signals (such as rising/falling edges or signal levels) over a trigger-function signal line. The slave includes a trigger conditioning block that in response issues a trigger-function request to the slave MCU, which calls/executes the associated software function, including accessing the associated trigger-function parameters from function interface memory. A slave can include a hardware function block with functionality configurable by a pre-loaded software configuration function (with associated parameters). A master can include a hardware function block configured to issue trigger-function signals. The slave (trigger conditioning block) can be configured to service trigger-function signals as an IRQ (interrupt request) to the MCU, which executes an ISR (interrupt service routine) as a triggered function call.

17 Claims, 1 Drawing Sheet

(56) References Cited

U.S. PATENT DOCUMENTS

| | | | | |
|---|---|---|---|---|
| 2006/0294428 | A1* | 12/2006 | Lai | G06F 11/263 714/31 |
| 2009/0150892 | A1* | 6/2009 | Gibbs | G06F 13/26 718/103 |
| 2013/0054669 | A1* | 2/2013 | Nachreiner | G06F 9/547 709/201 |
| 2014/0082117 | A1* | 3/2014 | Unhale | H04L 67/306 709/208 |
| 2015/0074649 | A1* | 3/2015 | Lee | G06F 11/3688 717/124 |
| 2015/0339243 | A1* | 11/2015 | Langas | G06F 3/0605 710/20 |

* cited by examiner

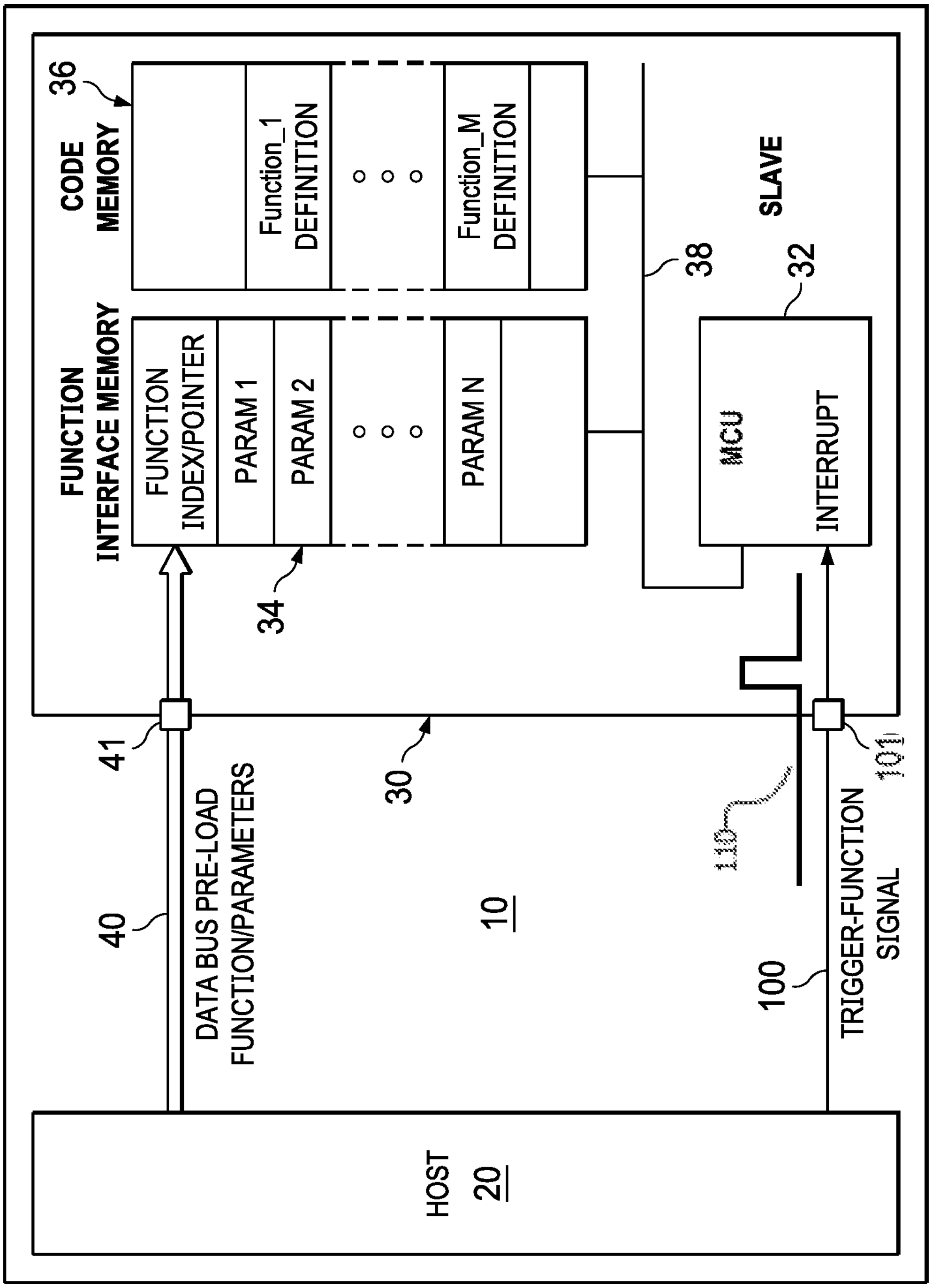
CODE MEMORY
36
Function_1 DEFINITION
Function_M DEFINITION
FUNCTION INTERFACE MEMORY
FUNCTION INDEX/POINTER
PARAM 1
PARAM 2
PARAM N
34
38
32
SLAVE
MCU
INTERRUPT
41
30
110
101
40
DATA BUS PRE-LOAD FUNCTION/PARAMETERS
10
100
TRIGGER-FUNCTION SIGNAL
HOST
20

WIRED COMMUNICATION WITH REMOTE FUNCTION CALLS

CROSS-REFERENCE TO RELATED APPLICATIONS

Priority is claimed under USC § 119(e) to US Provisional Application 62/035,222, filed Aug. 8, 2014.

BACKGROUND

Technical Field.

This Patent Document relates generally to master/host-slave systems, including slave configuration/function control.

Related Art.

In a master/host-slave system, a master/host processor commonly communicates with slave devices, such as MCU (microcontroller units) through a standardized communication bus, such as SPI, I2C (referred to as com links).

System design flexibility for both masters and slaves can be enhanced by the integration of hardware function blocks requiring control, operation or configuration that is not practical over these com links. For example, a master can integrate hardware function blocks such as hardware state machines or hardware accelerators that need to send real-time requests to slaves (including slave-side hardware function blocks) that are not practical over these com links because either these hardware blocks are not configured for the communication protocol, or these com links are too slow to support real-time function requests. Also, a slave can integrate hardware function blocks such as phase locked loops and transmitter/receivers that require real-time configuration/control that again is not practical over these com links.

One approach is using slave-side hardware state machines or software interrupt service routines. However, because customer requirements change, it can be problematic to re-configure/update slave-side hardware function blocks. It is also problematic for traditional interrupt service routines to handle complex requests requiring a number of input parameters.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes a triggered remote function call methodology suitable for use in a master-slave system to trigger slave-side software functions pre-loaded by a master into slave MCU memory, with associated parameters pre-loaded into a slave function interface memory. A master issues trigger-function signals (such as rising/falling edges or signal levels) over a trigger-function signal line. The slave includes a trigger conditioning block that in response issues a trigger-function request to the slave MCU, which calls/executes the associated software function, including accessing the associated trigger-function parameters from function interface memory. A slave can include a hardware function block with functionality configurable by a pre-loaded software configuration function (with associated parameters). A master can include a hardware function block configured to issue trigger-function signals. The slave (trigger conditioning block) can be configured to service trigger-function signals as an IRQ (interrupt request) to the MCU, which executes an ISR (interrupt service routine) as a triggered function call.

Other aspects and features of the invention claimed in this Patent Document will be apparent to those skilled in the art from the following Disclosure.

BRIEF DESCRIPTION OF THE DRAWINGS

FIG. 1 illustrates an example master/host-slave system 10 (20/30) configured to use triggered remote function calls for slave-side software functions pre-loaded by the master 20 into slave/MCU memory 34, with associated parameters pre-loaded into a function interface memory 36, including a dedicated trigger-function signal line 100 over which the master issues trigger-function signals 110 (such as rising/falling edges or signal levels).

DETAILED DESCRIPTION

This Description and the Drawings constitute a Disclosure of a triggered remote function call methodology, such for a master/slave system including controlling slave side hardware functionality/configuration.

As used in this Disclosure, master/host and slave are generic for networked devices configured to implement a triggered remote function call methodology according to this Disclosure.

In brief overview, the Disclosed triggered remote function calls can be used in master-slave systems to trigger slave-side software functions pre-loaded by a master into slave MCU memory, with associated parameters pre-loaded into a slave function interface memory. A master issues trigger-function signals (such as rising/falling edges or signal levels) over a trigger-function signal line. The slave includes a trigger conditioning block that in response issues a trigger-function request to the slave MCU, which calls/executes the associated software function, including accessing the associated trigger-function parameters from function interface memory. A slave can include a hardware function block with functionality configurable by a pre-loaded software configuration function (with associated parameters). A master can include a hardware function block configured to issue trigger-function signals. The slave (trigger conditioning block) can be configured to service trigger-function signals as an IRQ (interrupt request) to the MCU, which executes an ISR (interrupt service routine) as a triggered function call.

FIG. 1 illustrates an example master/host-slave 20/30 system 10 configured to use triggered remote function calls for slave-side software functions. The slave-side software functions are pre-loaded by the master 20 into slave/MCU 30/32 memory 34, with associated parameters pre-loaded into a function interface memory 36, over a data bus 40 through a slave data port 41. The triggered remote function calls are issued by the master 20 over a dedicated trigger-function signal line 100 over which the master issues trigger-function signals 110 (such as rising/falling edges or signal levels), through a dedicated trigger-function terminal 101.

The master 20 issues a trigger-function signal 110 to request a triggered remote software function call 38. The master can include hardware function blocks configured to issue trigger-function signals.

Software function name and all of its parameters are loaded 40 prior to triggering a remote function call for the software function. Hence, when a trigger-function signal 110 is sent, the slave MCU 30/32 will call/execute 38 the software function 34 requested by the master 20, with all the function parameters pre-loaded into function interface memory 36.

The trigger-function signal 110 characteristic can be, for example, a rising/falling signal edge, or a signal level.

Triggered remote function call procedure can include: (1) master 20 pre-loads into MCU memory 34 the software function (function definition), and pre-loads into function-interface memory 36 the associated function_parameters, including function_name/index; (2) master issues a trigger-function signal 110 to the slave (over the dedicated trigger-function signal line 100), requesting call/execution of this software function; (3) slave issues, for example, an IRQ (interrupt service request) for an ISR (interrupt service routine) that reads the function-interface-memory 34 to determine the software function requested by the master (function_name/index); (4) requested software function is called 38 with the associated parameters stored in the function interface memory 36; and (5) the slave/MCU executes the software function called by the triggered remote function call.

The master 20 can specify slave-side functions as interrupt service routines, which can be updated by the master.

The master 20 can specify all function parameters, including updating/changing the parameters, that control slave 30 response to a triggered function call request.

The slave 30 can respond to master trigger function call requests, including requests from master-integrated hardware function/control blocks, according to pre-configured (and reconfigurable) functions/parameters.

Using triggered function calls according to this Disclosure, certain slave IC (integrated circuit) features can be soft-defined.

As one example, a slave with an on-chip PLL, but without a hardware re-lock function, can re-lock the PLL in response to trigger-function control signal (such as a rising edge). A PLL_re-lock function is pre-loaded into MCU/function interface memory. A trigger conditioning block can be configured to respond to a PLL_re-lock trigger-function control signal by issuing an IRQ to the slave/MCU.

As another example, a master-side communication application can require TDD ON/OFF functionality for slave-side receiver/transmitter blocks, but, for example, due to ambiguity with respect to which sub-functionality in the receiver/transmitter block is being on/off toggled, this TDD ON/OFF functionality is not implemented in the receiver/transmitter hardware. A TDD-ON-OFF_function can be pre-loaded into the MCU/function interface memory. This function can include a case statement that executes a different sequence based on rising or falling edges of a trigger-function control signal. The trigger conditioning block can be configured to set a flag that indicates whether a rising or falling edge was last observed, and trigger the appropriate IRQ when either occurs.

Thus, master trigger-function requests are configurable, and reconfigurable. Reconfiguration of the software function and/or its parameters in between occurrences of trigger-function control signal events can be used to reconfigure, the slave-side response to the trigger-function control signal that initiates a triggered remote function call. That is, using the same trigger-function control signal (110), the master can request slave execution of different tasks according to the pre-loaded software function.

The latency for execution of a software function in response to a trigger-function control signal is faster than regular software function execution through corn links such as I2C or SPI. The latency can be as low as the task switching time of the slave/MCU. This allows real-time requests, and can be comparable to hardware based control.

In addition, triggered remote function call methodology can reduce SOC (system on chip) design risk because some missing features can be patched as a triggered remote function call (such as using IRQ/ISR functionality).

Similarly, the feature allows the design of a device with generic, albeit application specific, hardware resources, and the definition of specific application related device behavior via custom functions and/or parameters. Such a device could include reserved areas in MCU/code memory, together with the associated trigger-function signal pins and trigger conditioning block.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A wired communication system for master and slave devices, comprising a master device;

a slave device including:

a microcontroller unit (MCU) to call and execute software functions;

an MCU memory to store one or more software functions;

a function interface memory to store associated function parameters for the one or more software functions;

a data bus interfaced to the master and slave devices through respective data bus ports;

at least one trigger-function signal line between the master and slave devices, interfaced through a respective trigger-function signal line terminal;

the master device operable to pre-load to the slave device over the data bus one or more software functions for storage in the MCU memory as one or more pre-loaded software functions, and associated function parameters for the one or more pre-loaded software functions for storage in the function interface memory as pre-loaded associated function parameters;

the master device further operable to issue a trigger-function signal to the slave device over the trigger-function signal line, the trigger function signal associated with a selected pre-loaded software function stored in the slaved device MCU memory;

the slave device operable to receive the issued trigger-function signal through the trigger-function signal line terminal, and to provide a corresponding trigger-function request to the MCU;

the MCU to respond to the trigger-function request by calling and executing the selected pre-loaded software function associated with the trigger-function signal, including accessing the pre-loaded associated function parameters from the function interface memory.

2. The system of claim 1, wherein the slaved device further includes a hardware function block with functionality configurable by a pre-loaded software configuration function including pre-loaded associated configuration function parameters.

3. The system of claim 1 wherein the master device further includes a hardware function block configured to issue a trigger-function signal to the slave device.

4. The system of claim 1, wherein the slave device further includes a trigger conditioning block interfaced to the trigger-function signal line terminal, to receive the issued trigger-function signal, and generate the trigger-function request to the MCU.

5. The system of claim 4, wherein the trigger conditioning block is configured to issue an IRQ (interrupt request) to the MCU, and the MCU is configured to execute an ISR (interrupt service routine) in response to the IRQ to call the selected pre-loaded software function associated with the issued trigger-function signal, including the pre-loaded associated function parameters.

6. The system of claim 4, wherein the trigger conditioning block is configured to generate the trigger-function request to the MCU based on at least one of a rising edge and a falling edge of the trigger-function signal.

7. A wired communication system with remote function calls, comprising a first device;

a second device including:

a microcontroller unit (MCU) to call and execute software functions;

an MCU memory to store one or more software functions;

a function interface memory to store associated function parameters for the one or more software functions;

a data bus interfaced to the first and second devices through respective data bus ports;

at least one trigger-function signal line between the first and second devices, interfaced through a respective trigger-function signal line terminal;

the first device operable to pre-load to the slave device over the data bus one or more software functions for storage in the MCU memory as one or more pre-loaded software functions, and associated function parameters for the one or more pre-loaded software functions for storage in the function interface memory as pre-loaded associated function parameters;

the first device further operable to issue a trigger-function signal to the slave device over the trigger-function signal line, the trigger function signal associated with a selected pre-loaded software function stored in the slaved device MCU memory;

the second device operable to receive the issued trigger-function signal through the trigger-function signal line terminal, and to provide a corresponding trigger-function request to the MCU;

the MCU to respond to the trigger-function request by calling and executing the selected pre-loaded software function associated with the trigger-function signal, including accessing the pre-loaded associated function parameters from the function interface memory.

8. The system of claim 7, wherein the second device further includes a hardware function block with functionality configurable by a pre-loaded software configuration function including pre-loaded associated configuration function parameters.

9. The system of claim 7 wherein the first device further includes a hardware function block configured to issue a trigger-function signal to the second device.

10. The system of claim 7, wherein the second device further includes a trigger conditioning block interfaced to the trigger-function signal line terminal, to receive the issued trigger-function signal, and generate the trigger-function request to the MCU.

11. The system of claim 10, wherein the trigger conditioning block is configured to issue an IRQ (interrupt request) to the MCU, and the MCU is configured to execute an ISR (interrupt service routine) in response to the IRQ to call the selected pre-loaded software function associated with the issued trigger-function signal, including the pre-loaded associated function parameters.

12. The system of claim 10, wherein the trigger conditioning block is configured to generate the trigger-function request to the MCU based on at least one of a rising edge and a falling edge of the trigger-function signal.

13. A device for use in a wired communication system, the device comprising a microcontroller unit (MCU) to call and execute software functions;

an MCU memory to store one or more software functions;

a function interface memory to store associated function parameters for the one or more software functions;

a data bus port to interface to a data bus;

at least one trigger-function signal line terminal to interface to a trigger-function signal line;

the device operable to receive through the data bus port one or more software functions for storage in the MCU memory as one or more pre-loaded software functions, and associated function parameters for the one or more pre-loaded software functions for storage in the function interface memory as pre-loaded associated function parameters;

the device further operable to receive through the trigger-function signal line terminal a trigger-function signal associated with a selected pre-loaded software function stored in the MCU memory, and to provide a corresponding trigger-function request to the MCU;

the MCU to respond to the trigger-function request by calling and executing the selected pre-loaded software function associated with the trigger-function signal, including accessing the pre-loaded associated function parameters from the function interface memory.

14. The device of claim 13, wherein the device further includes a hardware function block with functionality configurable by a pre-loaded software configuration function including associated pre-loaded configuration function parameters.

15. The device of claim 14, wherein the device further includes a trigger conditioning block interfaced to the trigger-function signal line terminal, to receive the trigger-function signal, and generate the trigger-function request to the MCU.

16. The device of claim 15, wherein the trigger conditioning block is configured to issue an IRQ (interrupt request) to the MCU, and the MCU is configured to execute an ISR (interrupt service routine) in response to the IRQ to call the selected pre-loaded software function associated with the issued trigger-function signal, including the associated pre-loaded function parameters.

17. The device of claim 15, wherein the trigger conditioning block is configured to generate the trigger-function request to the MCU based on at least one of a rising edge and a falling edge of the trigger-function signal.

* * * * *